(12) United States Patent
Matsumoto et al.

(10) Patent No.: US 7,104,704 B2
(45) Date of Patent: Sep. 12, 2006

(54) TRANSMISSION APPARATUS USING A PLASTIC FIBER

(75) Inventors: Kenji Matsumoto, Kaisei-machi (JP); Toshiro Hayakawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 92 days.

(21) Appl. No.: 10/603,078

(22) Filed: Jun. 25, 2003

(65) Prior Publication Data
US 2004/0076388 A1   Apr. 22, 2004

(30) Foreign Application Priority Data
Jun. 25, 2002   (JP)   ............... 2002-184670

(51) Int. Cl.
  *G02B 6/42*   (2006.01)
(52) U.S. Cl. ............... 385/88; 398/202; 398/214
(58) Field of Classification Search ............... 385/49, 385/88–94; 398/FOR. 180, FOR. 186, 202–214
  See application file for complete search history.

(56) References Cited

U.S. PATENT DOCUMENTS

| | | | |
|---|---|---|---|
| 4,366,377 A | | 12/1982 | Notthoff et al. |
| 4,936,681 A | * | 6/1990 | Ruhrmann ............... 356/133 |
| 5,189,296 A | * | 2/1993 | Kwark ............... 250/208.2 |
| 5,714,773 A | | 2/1998 | Burrows et al. |
| 6,334,014 B1 | * | 12/2001 | Nitta et al. ............... 385/39 |
| 2003/0053769 A1 | * | 3/2003 | Schunk ............... 385/93 |

FOREIGN PATENT DOCUMENTS

JP   11289317 A   * 10/1999

OTHER PUBLICATIONS

EP Search Report dated Mar. 4, 2005 for Appln. No. 03014173.3-2415-.

* cited by examiner

*Primary Examiner*—Michelle Connelly-Cushwa
(74) *Attorney, Agent, or Firm*—Sughrue Mion, PLLC

(57) ABSTRACT

A transmission apparatus comprises a plastic fiber, and a photodetector for detecting light, which has been propagated through the plastic fiber. The photodetector comprises a plurality of semiconductor light receiving devices, whose light receiving sensitivity wavelength regions are identical with one another, each of the semiconductor light receiving devices having a light receiving area smaller than a cross-sectional area of a core of the plastic fiber. The transmission apparatus is capable of achieving both a high light receiving efficiency and quick response characteristics.

20 Claims, 4 Drawing Sheets

(LIGHT ENTRY END FACE)

(LIGHT RADIATING END FACE)

(LIGHT ENTRY END FACE)

(LIGHT RADIATING END FACE)

TRANSMISSION APPARATUS USING A PLASTIC FIBER

BACKGROUND OF THE INVENTION

1. Field of the Invention

This invention relates to a transmission apparatus, which utilizes a plastic fiber, for use in an optical communication system, and the like.

2. Description of the Related Art

Ordinarily, as light propagation paths in optical communication, single mode fibers or multi-mode fibers containing quartz glass as a principal material are utilized. The single mode fibers or the multi-mode fibers containing quartz glass as a principal material have a diameter of at most 200 µm. In alignment processes for the fibers, a high position matching accuracy on the order of micron is required. Therefore, fiber laying operations under ordinary environmental conditions, such as conditions at construction work sites, are not easy to perform. The difficulty of the fiber laying operations obstructs further popularization of the fibers described above.

Recently, plastic fibers, which have a comparatively large diameter and are comparatively easy to lay, have been proposed. However, for reasons of production processes, the plastic fibers primarily have a step index type of structure. The step index types of plastic fibers cannot transmit a signal of a high bit rate over a long distance. Specifically, in cases where a pulsed light signal as illustrated in FIG. 8A is inputted into a light entry end face of the step index type of fiber, a phenomenon is encountered in that a wave form of the pulsed light signal becomes deformed and spreads at a light radiating end face of the fiber as illustrated in FIG. 8B after being propagated over a long distance through the fiber. Therefore, in cases where a successively pulsed light signal as illustrated in FIG. 9A is inputted into the step index type of fiber and transmitted through the step index type of fiber, the problems occur in that, as illustrated in FIG. 9B, the pulses, which are adjacent to each other on the time axis, overlap one upon the other, and a perfectly extinct state cannot be obtained with respect to a logic "0" level of the signal at the light radiating end face of the fiber. In other words, in cases where the pulsed light signal of a short pulse width is transmitted through the fiber, a logic "0" level and a logic "1" level of the signal cannot easily be discriminated from each other after the signal has been transmitted through the fiber. Accordingly, the step index types of plastic fibers are not appropriate for large capacities of optical communication. The problems described above are described in, for example, "Fundamentals and Practice of Plastic Optical Fibers" by Yasuhiro Koike, supervised by Seizo Miyata, NTS K. K., pp. 84–87, 2000.

In order for the aforesaid problems to be eliminated, a graded index type of fiber, which has a comparatively large diameter and is free from an increase in pulse width of a pulsed light signal after being transmitted, has been proposed and is expected to be used in practice. However, it has been found that the problems described below are encountered with this type of fiber.

Specifically, the plastic fiber has the feature such that the diameter of the plastic fiber is capable of being set to be large. This means that, as illustrated in FIG. 7, in cases where the light signal having been propagated through the plastic fiber is to be detected and converted into an electric signal, it becomes necessary to utilize a photodetector 5, which has a light receiving section 4 having a large area corresponding to a cross-sectional area of a core 2 of a plastic fiber 1, in order for the light signal to be detected efficiently. (In FIG. 7, reference numeral 3 represents a cladding layer.) However, a light receiving device having a light receiving section with a large area corresponding to the core diameter of the plastic fiber, which core diameter is ordinarily at least 500 µm, has the problems in that the light receiving device has a large electric capacity and cannot always convert the quickly modulated light signal into the electric signal in response to the quickly modulated light signal.

More specifically, in cases where a successively pulsed light signal as illustrated in FIG. 10A is inputted into the plastic fiber, and the successively pulsed light signal having been propagated through the plastic fiber is detected by the light receiving device, which is provided with the light receiving section having a large area, at the light radiating end face of the plastic fiber, a detection signal is obtained such that, as indicated by a wave form A in FIG. 10B, the logic "0" level of the detection signal cannot be obtained with respect to the logic "0" level of the light signal, and therefore the logic "0" level and the logic "1" level of the light signal cannot easily be discriminated from each other.

In order for the aforesaid problems to be solved, it may be considered that a light receiving device, which has a small electric capacity and is capable of performing quick response, be utilized. However, the light receiving device, which has a small electric capacity and is capable of performing quick response, is capable of detecting only a small part of the light radiated out from the plastic fiber. Therefore, in such cases, a detection signal is obtained such that, as indicated by a wave form B in FIG. 10B, though the response characteristics are good, the intensity of the detection signal is markedly low.

SUMMARY OF THE INVENTION

The primary object of the present invention is to provide a transmission apparatus comprising a combination of a plastic fiber, which is capable of forming a large-diameter core, and a semiconductor light receiving device, the transmission apparatus being constituted such that both a high light receiving efficiency and quick response characteristics are achieved.

The present invention provides a transmission apparatus using a plastic fiber, comprising:
  i) a plastic fiber, and
  ii) a photodetector for detecting light, which has been propagated through the plastic fiber,
wherein the photodetector comprises a plurality of semiconductor light receiving devices, whose light receiving sensitivity wavelength regions are identical with one another, each of the semiconductor light receiving devices having a light receiving area smaller than a cross-sectional area of a core of the plastic fiber.

In the transmission apparatus using a plastic fiber in accordance with the present invention, a core diameter of the plastic fiber should preferably be at least 500 µm.

Also, the transmission apparatus using a plastic fiber in accordance with the present invention should preferably be modified such that a total sum of the light receiving areas of the plurality of the semiconductor light receiving devices is approximately equal to a cross-sectional area of the plastic fiber, and the plurality of the semiconductor light receiving devices are located such that the plurality of the semiconductor light receiving devices directly receive the light, which is radiated out from the plastic fiber, without an optical system intervening between the plastic fiber and the semiconductor light receiving devices.

Further, the transmission apparatus using a plastic fiber in accordance with the present invention should preferably be modified such that the plurality of the semiconductor light receiving devices have a response band of at least 1 GHz.

Furthermore, the transmission apparatus using a plastic fiber in accordance with the present invention should preferably be modified such that the plurality of the semiconductor light receiving devices are formed on a single same base plate.

Also, the transmission apparatus using a plastic fiber in accordance with the present invention should preferably be modified such that each of the plurality of the semiconductor light receiving devices is connected to one of a plurality of independent amplifiers.

With the transmission apparatus using a plastic fiber in accordance with the present invention, the photodetector comprises the plurality of the semiconductor light receiving devices, whose light receiving sensitivity wavelength regions are identical with one another, each of the semiconductor light receiving devices having the light receiving area smaller than the cross-sectional area of the core of the plastic fiber. Therefore, the light having been propagated through the plastic fiber is capable of being detected by the group of the plurality of the semiconductor light receiving devices. Accordingly, a high light receiving efficiency is capable of being achieved.

Also, since each of the semiconductor light receiving devices is smaller than the cross-sectional area of the core of the plastic fiber, each of the semiconductor light receiving devices has a small electric capacity and is capable of achieving quick response. Therefore, the transmission apparatus using a plastic fiber in accordance with the present invention has quick response characteristics.

The transmission apparatus using a plastic fiber in accordance with the present invention may be modified such that the total sum of the light receiving areas of the plurality of the semiconductor light receiving devices is approximately equal to the cross-sectional area of the plastic fiber, and the plurality of the semiconductor light receiving devices are located such that the plurality of the semiconductor light receiving devices directly receive the light, which is radiated out from the plastic fiber, without an optical system intervening between the plastic fiber and the semiconductor light receiving devices. With the modification described above, approximately all of the light having been radiated out from the plastic fiber is capable of being received by the plurality of the semiconductor light receiving devices. Therefore, a particularly high light receiving efficiency is capable of being achieved.

DESCRIPTION OF THE PREFERRED EMBODIMENTS

The present invention will hereinbelow be described in further detail with reference to the accompanying drawings.

Figure 1:
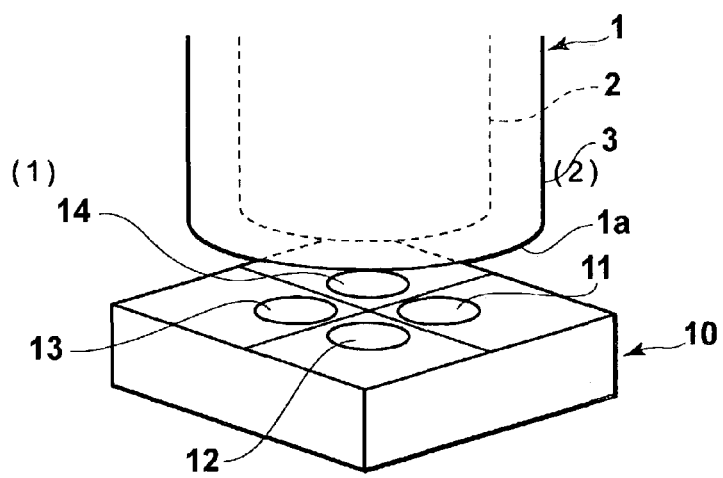
FIG. 1 is a perspective view showing a first embodiment of the transmission apparatus using a plastic fiber in accordance with the present invention.

FIG. 1 is a perspective view showing a first embodiment of the transmission apparatus using a plastic fiber in accordance with the present invention. With reference to FIG. 1, the first embodiment of the transmission apparatus using a plastic fiber in accordance with the present invention comprises a plastic fiber 1, which is constituted of a core 2 and a cladding layer 3 surrounding the core 2. The transmission apparatus also comprises a photodetector 10, which is located in the vicinity of a light radiating end face 1a of the plastic fiber 1.

The core 2 of the plastic fiber 1 is constituted of a polymethyl methacrylate (PMMA) and has a core diameter of 1 mm. By way of example, the photodetector 10 comprises four semiconductor light receiving devices 11, 12, 13, and 14, which are formed on a common base plate. The chip has a square shape having a size of approximately 3 mm×approximately 3 mm and has a thickness of 500 µm. Each of the semiconductor light receiving devices 11, 12, 13, and 14 is constituted of, for example, a photodiode having a light receiving section, which is indicated by the circle in FIG. 1 and has a diameter of 400 µm. Light receiving sensitivity wavelength regions of the semiconductor light receiving devices 11, 12, 13, and 14 are identical with one another and are in the vicinity of 650 nm. The photodetector 10 is located at a spacing of 100 µm from the light radiating end face 1a of the plastic fiber 1 without any optical system intervening between the photodetector 10 and the light radiating end face 1a of the plastic fiber 1.

The semiconductor light receiving devices 11, 12, 13, and 14 are formed on the base plate, such that electrodes of the semiconductor light receiving devices 11, 12, 13, and 14, which electrodes are located on the side not common to the base plate, are electrically isolated from one another. In cases where the semiconductor light receiving devices 11, 12, 13, and 14 are connected in parallel instead of being electrically isolated from one another, the group of the semiconductor light receiving devices 11, 12, 13, and 14 becomes electrically equivalent to a single semiconductor light receiving device having a large light receiving area and cannot have the effect of achieving quick response. However, with the first embodiment of the transmission apparatus using a plastic fiber in accordance with the present invention, each of the semiconductor light receiving devices 11, 12, 13, and 14 has a small light receiving area and a small electric capacity. Therefore, the first embodiment of the transmission apparatus using a plastic fiber in accordance with the present invention is capable of achieving quick response.

Figure 2:
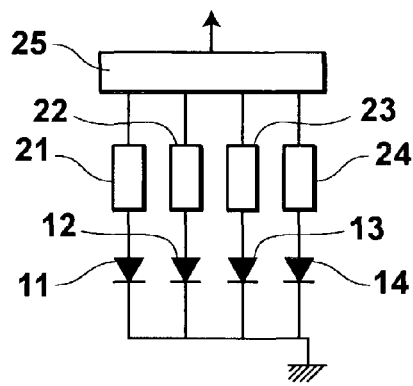
FIG. 2 is a circuit diagram showing an electric circuit of the transmission apparatus of FIG. 1.

FIG. 2 is a circuit diagram showing an electric circuit of the transmission apparatus of FIG. 1. As illustrated in FIG. 2, the semiconductor light receiving devices 11, 12, 13, and 14 are connected respectively to independent pre-amplifiers 21, 22, 23, and 24 for amplifying output signals of the corresponding semiconductor light receiving devices 11, 12, 13, and 14. Also, outputs of the pre-amplifiers 21, 22, 23, and 24 are collected and amplified by a single amplifier 25. Therefore, the light having been propagated through the plastic fiber 1 is detected by the group of the four semiconductor light receiving devices 11, 12, 13, and 14. Accordingly, the light receiving efficiency is capable of being kept high.

Figure 3A:
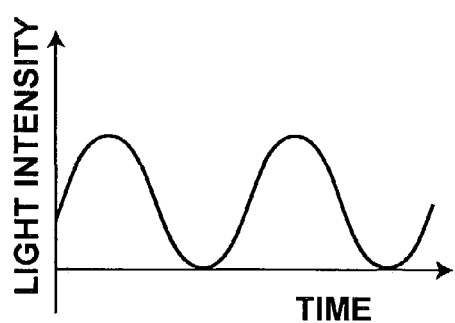
FIG. 3A is an explanatory graph showing an example of a wave form of a successively pulsed light signal, which is inputted into a plastic fiber of the transmission apparatus of FIG. 1.
Figure 3B:
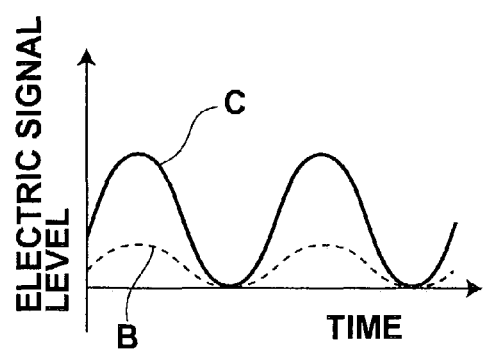
FIG. 3B is an explanatory graph showing a wave form B of a light detection signal, which is obtained from amplification of an output of each of semiconductor light receiving devices with a pre-amplifier in cases where the successively pulsed light signal shown in FIG. 3A has been inputted into the plastic fiber of the transmission apparatus of FIG. 1, and a wave form C of a light detection signal, which is obtained from amplification of a total sum of the pre-amplified light detection signals of the semiconductor light receiving devices, the amplification being performed by an amplifier.

Specifically, for example, a successively pulsed light signal, which has a wave form as illustrated in FIG. 3A, may be inputted into the plastic fiber 1. In such cases, a light detection signal, which is obtained from the amplification of the output of each of the semiconductor light receiving devices 11, 12, 13, and 14 performed by the corresponding one of the pre-amplifiers 21, 22, 23, and 24, has a wave form B illustrated in FIG. 3B. Also, a light detection signal, which is obtained from the amplification of the total sum of the pre-amplified light detection signals of the semiconductor light receiving devices 11, 12, 13, and 14, the amplification being performed by the amplifier 25, has a wave form C illustrated in FIG. 3B and thus has a high level. Also, as described above, quick response is capable of being achieved. Therefore, the light detection signal formed by the amplifier 25 is capable of being obtained such that the logic "0" level of the light detection signal is capable of being obtained with respect to the logic "0" level of the pulsed light signal, and therefore the logic "0" level and the logic "1" level of the pulsed light signal are capable of being reliably discriminated from each other. Accordingly, with the first embodiment of the transmission apparatus using a plastic fiber in accordance with the present invention, an electric signal, which accurately follows the light signal and is free from error, is capable of being obtained.

More specifically, in cases where a light signal of 1.25 Gbps (1.25 giga bits per second) is inputted into the plastic fiber 1 and transmitted through the plastic fiber 1, and the transmitted light signal is detected with the four semiconductor light receiving devices 11, 12, 13, and 14, an electric signal is capable of being obtained such that the logic "0" level of the electric signal is obtained with respect to the logic "0" level of the light signal, and the signal wave form is free from deformation.

In this embodiment, the light receiving area of each of the four semiconductor light receiving devices 11, 12, 13, and 14 is equal to approximately 0.13 mm$^2$ (=0.2×0.2×3.14). As described above, with the semiconductor light receiving devices 11, 12, 13, and 14 having the light receiving areas described above, the 1.25 Gbps light signal is capable of being accurately converted into the electric signal. Also, in cases where the diameter of each of the light receiving sections of the semiconductor light receiving devices 11, 12, 13, and 14 is set at 200 μm, which is one half of the diameter (400 μm) of each light receiving section in the first embodiment, a 2.5 Gbps light signal is capable of being accurately converted into the electric signal. Therefore, in order for a quick light signal of approximately 1 Gbps, which is ordinarily considered to be capable of being transmitted through the graded index type of the plastic fiber, to be accurately converted into an electric signal, the diameter of each of the light receiving sections of the semiconductor light receiving devices maybe set at approximately at most 400 μm.

Figure 4:
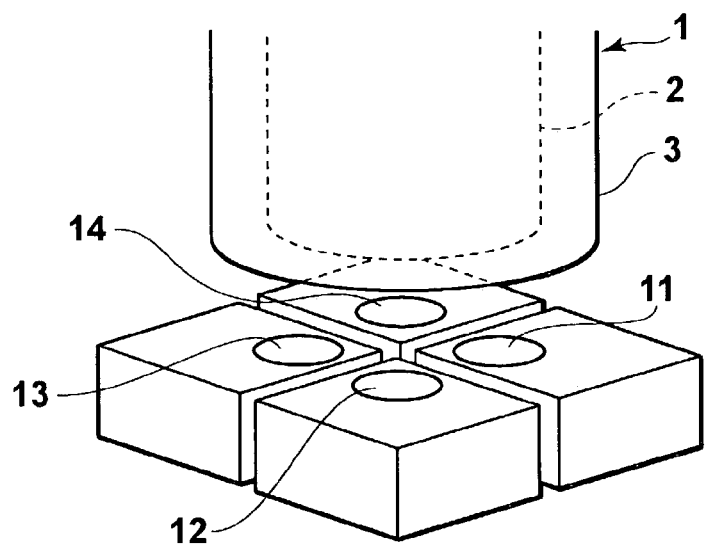
FIG. 4 is a perspective view showing a second embodiment of the transmission apparatus using a plastic fiber in accordance with the present invention.

A second embodiment of the transmission apparatus using a plastic fiber in accordance with the present invention will be described hereinbelow with reference to FIG. 4 and FIG. 5. FIG. 4 is a perspective view showing the second embodiment of the transmission apparatus using a plastic fiber in accordance with the present invention. In the second embodiment, as illustrated in FIG. 4, the four semiconductor light receiving devices 11, 12, 13, and 14 are formed on four independent base plates. Also, each of the semiconductor light receiving devices 11, 12, 13, and 14 is provided with the light receiving section, which is indicated by the circle in FIG. 4 and has an area smaller than the cross-sectional area of the core 2 of the plastic fiber 1. Further, the light receiving sensitivity wavelength regions of the semiconductor light receiving devices 11, 12, 13, and 14 are identical with one another. In such cases, the same effects as those with the aforesaid first embodiment are capable of being obtained.

Figure 5:
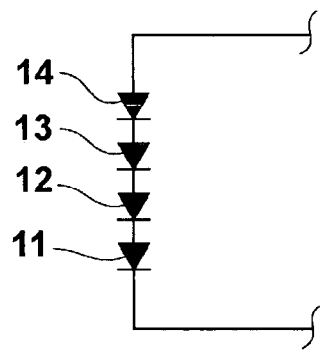
FIG. 5 is a circuit diagram showing an electric circuit of the transmission apparatus of FIG. 4.

FIG. 5 is a circuit diagram showing an electric circuit of the transmission apparatus of FIG. 4. As illustrated in FIG. 5, in the second embodiment, the semiconductor light receiving devices 11, 12, 13, and 14 are connected in series. In such cases, since the light receiving area of each of the semiconductor light receiving devices 11, 12, 13, and 14 is small, quick response is capable of being achieved. Also, the light signal having been propagated through the plastic fiber 1 is capable of being detected by the group of the four semiconductor light receiving devices 11, 12, 13, and 14. Therefore, the light receiving efficiency is capable of being kept high.

Figure 6:
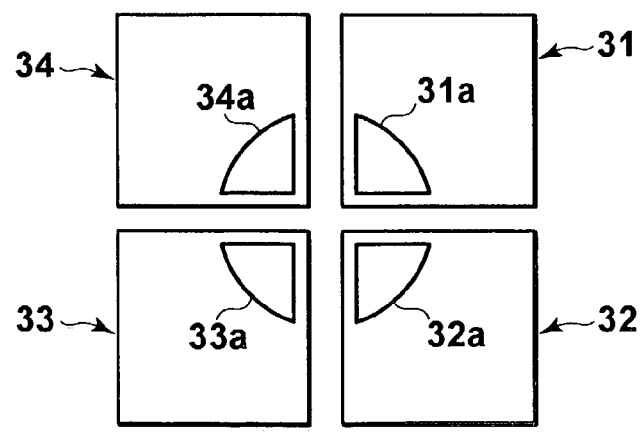
FIG. 6 is a plan view showing a different example of semiconductor light receiving devices, which may be employed in the transmission apparatus using a plastic fiber in accordance with the present invention.
Figure 7:
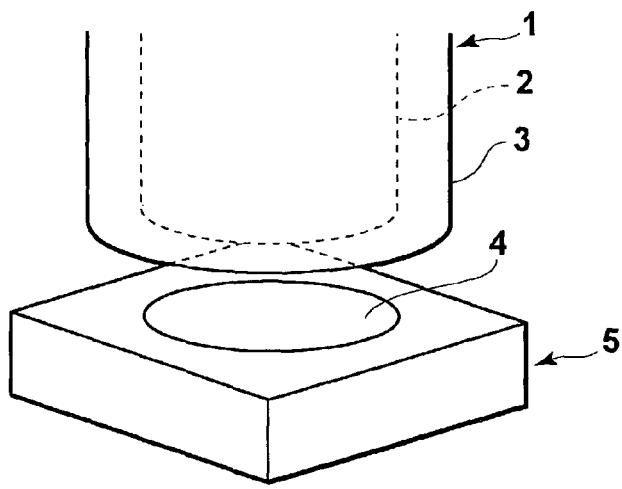
FIG. 7 is a perspective view showing an example of a conventional transmission apparatus using a plastic fiber.
Figure 8A:
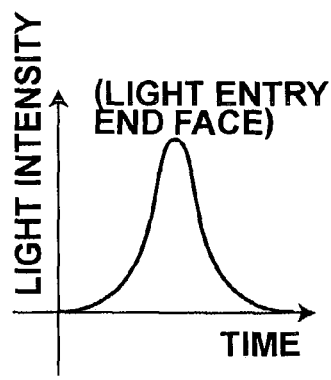
FIGS. 8A and 8B are explanatory graphs showing problems encountered with optical transmission utilizing the conventional transmission apparatus.
Figure 8B:
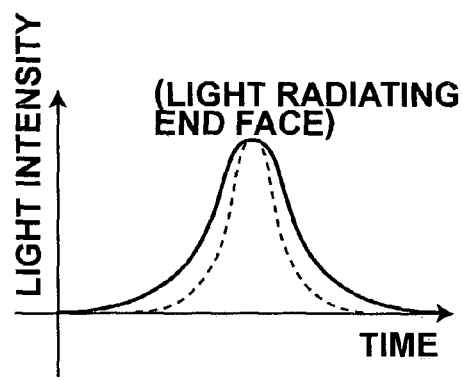
Figure 9A:
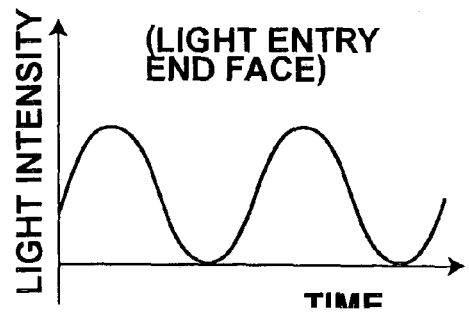
FIGS. 9A and 9B are explanatory graphs showing problems encountered with optical transmission utilizing the conventional transmission apparatus.
Figure 9B:
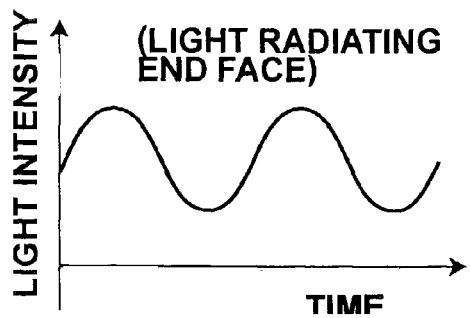
Figure 10A:
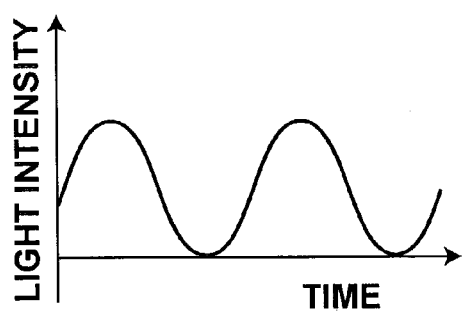
FIGS. 10A and 10B are explanatory graphs showing problems encountered with light signal detection utilizing the conventional transmission apparatus.
Figure 10B:
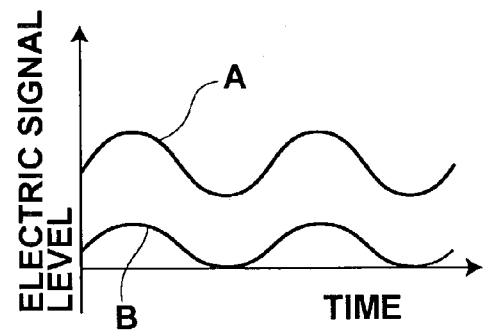

In the first and second embodiments described above, each of the light receiving sections of the semiconductor light receiving devices has the circular shape. Alternatively, each of the light receiving sections of the semiconductor light receiving devices may have an asymmetric shape. For example, as illustrated in FIG. 6, it is possible to employ semiconductor light receiving devices 31, 32, 33, and 34, which are respectively provided with light receiving sections 31a, 32a, 33a, and 34a having an approximately sectorial shape. In such cases, in order for a high light receiving efficiency to be obtained, the light receiving sections 31a, 32a, 33a, and 34a should preferably be located such that the circular arc regions of the sectorial light receiving sections 31a, 32a, 33a, and 34a extend approximately along the outer circumference of the core of the plastic fiber (not shown in FIG. 6).

Also, in the transmission apparatus using a plastic fiber in accordance with the present invention, the number of the semiconductor light receiving devices is not limited to four and may be set at a number of at least two.

Further, in the first and second embodiments described above, the four semiconductor light receiving devices 11, 12, 13, and 14 are connected in parallel or in series. Alternatively, the plurality of the semiconductor light receiving devices may be connected with a technique for combining the parallel connection and series connection.

Furthermore, the transmission apparatus using a plastic fiber in accordance with the present invention is not limited to the use of the plastic fiber having the core consisting of the PMMA. It is also possible to employ a plastic fiber having a core, which is made from a material containing the PMMA and an additive substance. It is further possible to employ a plastic fiber having a core, which is made from a material other than the PMMA.

Also, besides the ordinary optical communication, the transmission apparatus using a plastic fiber in accordance with the present invention is applicable to every system for transmitting information as a light signal.

What is claimed is:

1. A transmission apparatus using a plastic fiber, comprising:
    i) a plastic fiber, and
    ii) a photodetector for detecting non-diffracted light, which has been propagated through the plastic fiber, wherein the photodetector comprises a plurality of semiconductor light receiving devices, whose light receiving sensitivity wavelength regions are identical with one another, each of the semiconductor light receiving devices having a light receiving area smaller than a cross-sectional area of a core of the plastic fiber;
    wherein the positional relationship between the plastic fiber and the photodetector is fixed; and
    wherein all of the plurality of the semiconductor light receiving devices receive the light which is radiated out, from the plastic fiber, wherein the photodetector is positioned at the end face of the plastic fiber, without an optical system intervening between the plastic fiber and the semiconductor light receiving devices.

2. An apparatus as defined in claim 1 wherein a total sum of the light receiving areas of the plurality of the semiconductor light receiving devices is approximately equal to a cross-sectional area of the plastic fiber, and
    the plurality of the semiconductor light receiving devices are located such that the plurality of the semiconductor light receiving devices directly receive the light, which is radiated out from the plastic fiber, without an optical system intervening between the plastic fiber and the semiconductor light receiving devices.

3. An apparatus as defined in claim 2 wherein the plurality of the semiconductor light receiving devices have a response band of at least 1 GHz.

4. An apparatus as defined in claim 2 wherein the plurality of the semiconductor light receiving devices are formed on a single same base plate.

5. An apparatus as defined in claim 2 wherein each of the plurality of the semiconductor light receiving devices is connected to one of a plurality of independent amplifiers.

6. An apparatus as defined in claim 2 wherein the plastic fiber is a graded index type of fiber.

7. An apparatus as defined in claim 1 wherein the plurality of the semiconductor light receiving devices have a response band of at least 1 GHz.

8. An apparatus as defined in claim 1 wherein the plurality of the semiconductor light receiving devices are formed on a single same base plate.

9. An apparatus as defined in claim 1 wherein each of the plurality of the semiconductor light receiving devices is connected to one of a plurality of independent amplifiers.

10. An apparatus as defined in claim 1 wherein the plurality of the semiconductor light receiving devices are formed on a single common base plate and are electrically isolated from one another.

11. An apparatus as defined in claim 1 wherein the base plate has a rectangular shape and is divided into four subregions, which are arrayed in two columns and in two rows, and
    each of the semiconductor light receiving devices is formed on one of the four subregions of the base plate.

12. An apparatus as defined in claim 11 wherein each of the semiconductor light receiving devices is formed on one of the four subregions of the base plate, such that a light receiving section of the semiconductor light receiving device is located at a position shifted from a center point of the subregion toward a center point of the entire base plate.

13. An apparatus as defined in claim 1 wherein the plurality of the semiconductor light receiving devices are formed on a plurality of independent base plates.

14. An apparatus as defined in claim 13 wherein each of the base plates has a rectangular shape, and the base plates are constituted of four base plates, which are arrayed in two columns and in two rows.

15. An apparatus as defined in claim 14 wherein each of the semiconductor light receiving devices is formed on one of the four base plates, such that a light receiving section of the semiconductor light receiving device is located at a position shifted from a center point of the base plate toward a center point of the array of the four base plates.

16. An apparatus as defined in claim 1 wherein the plastic fiber is a graded index type of fiber.

17. The transmission apparatus using a plastic fiber according to claim 1, wherein a core diameter of the plastic fiber is at least 500 μm.

18. The transmission apparatus using a plastic fiber according to claim 1, wherein each of the plurality of light receiving devices comprises a photodiode.

19. The transmission apparatus using a plastic fiber according to claim 1, wherein each of the light receiving areas of the plurality of semiconductor light receiving devices are circular.

20. A transmission apparatus using a plastic fiber, comprising:
    a plastic fiber, and
    a photodetector for detecting light, which has been propagated through the plastic fiber,
    wherein the photodetector comprises a plurality of semiconductor light receiving devices, whose light receiving sensitivity wavelength regions are identical with one another, each of the semiconductor light receiving devices having a light receiving area smaller than a cross-sectional area of a core of the plastic fiber, and
    wherein each of the light receiving areas of the plurality of semiconductor light receiving devices are asymmetrical.

* * * * *